United States Patent [19]

Lanter et al.

[11] Patent Number: 5,683,739
[45] Date of Patent: Nov. 4, 1997

[54] EXTRUDED ANIMAL FEED NUGGETS FOR RUMINANTS

[75] Inventors: Kent J. Lanter, Waterloo, Ill.; David C. Weakley, Eureka, Mo.

[73] Assignee: Purina Mills, Inc., St. Louis, Mo.

[21] Appl. No.: 680,710

[22] Filed: Jul. 11, 1996

Related U.S. Application Data

[62] Division of Ser. No. 421,234, Apr. 13, 1995, Pat. No. 5,540,932.

[51] Int. Cl.$^6$ .................................. A23K 1/18; A23K 1/16
[52] U.S. Cl. ................ 426/623; 426/656; 426/608; 426/516; 426/807; 424/438; 424/442
[58] Field of Search ........................ 426/623, 656, 426/608, 516, 807; 424/438, 442

[56] References Cited

U.S. PATENT DOCUMENTS

| | | | |
|---|---|---|---|
| 4,248,899 | 2/1981 | Lyon | 426/98 |
| 4,333,923 | 6/1982 | Beck et al. | 424/115 |
| 4,377,596 | 3/1983 | Larsen | 426/2 |
| 4,540,594 | 9/1985 | Schanze | 426/74 |
| 4,935,250 | 6/1990 | Cox | 426/94 |
| 5,120,565 | 6/1992 | Lanter et al. | 426/623 |
| 5,145,695 | 9/1992 | Smith et al. | 426/2 |
| 5,158,791 | 10/1992 | Nocek et al. | 426/231 |
| 5,182,126 | 1/1993 | Vinci et al. | 426/74 |
| 5,219,596 | 6/1993 | Smith et al. | 426/2 |
| 5,227,166 | 7/1993 | Ueda et al. | 424/438 |
| 5,540,932 | 7/1996 | Lanter et al. | 424/442 |

*Primary Examiner*—Donald E. Czaja
*Assistant Examiner*—Choon P. Koh
*Attorney, Agent, or Firm*—Whyte Hirschboeck Dudek S.C.

[57] ABSTRACT

Hard, stable, extruded animal feed nuggets are prepared for ruminants, the nuggets comprising between about 90 to 99 wt % of at least one protein-containing ingredient and between about 1.0 to 6.0 wt % of added fat. Preferably, the animal feed nugget is also comprised of between about 0.02 and 5.0 wt % of sulfur. The animal feed nugget of this invention is prepared by a method comprising the steps of:

A. plasticizing a blend of at least one protein-containing ingredient, added fat, sulfur, if present, and water in an extruder, B. extruding the plasticized blend to form an animal feed nugget, and C. drying the extruded nugget to a water content of less than about 12 wt %, based on the total weight of the nugget.

Animal feed nuggets prepared by this method function as a rumen escape composition in that they permit the release of beneficial nutrients in the abomasum or subsequent digestive tract. Thus, when this nugget is fed as part of a lower crude protein diet, the ruminants can actually achieve the same level of milk and milk component yield as those ruminants fed a normal crude protein diet.

6 Claims, No Drawings

EXTRUDED ANIMAL FEED NUGGETS FOR RUMINANTS

BACKGROUND OF THE INVENTION

This is a divisional of application Ser. No. 08/421,234 filed on Apr. 13, 1995, U.S. Pat. No. 5,540,932.

1. Field of the Invention

This invention relates to animal feed supplements for ruminants. More specifically, the invention relates to extruded animal feed nuggets which function as a rumen escape composition and permit the release of beneficial nutrients in the abomasum or subsequent digestive tract. In one aspect, the invention relates to extruded animal feed nuggets suitable for consumption by ruminants. In another aspect, the invention relates to a method of making an extruded animal feed nugget using conventional extrusion equipment. In still another aspect, the invention relates to finished feed products of which the extruded animal feed nugget is a component. In a further aspect, this invention relates to a method of achieving the same level of milk and milk component yield in ruminants which are fed a lower crude protein diet than those which are fed a normal crude protein diet.

2. Description of the Prior Art

In ruminant animals, such as cattle and sheep, microorganisms in the rumen are responsible for degrading most biologically active substances, such as proteins and amino acids. This microbial intervention inhibits the provision of supplemental nutrients to the ruminant because many desirable nutrients are metabolized before they reach a site where they can be absorbed and utilized by the host animal. Accordingly, it is important to pass these biologically active substances through the rumen without decomposition by microorganisms to allow their effective digestion and absorption in the abomasum and subsequent digestive tract.

Many techniques, formulations and the like have been tried in the past to protect the biologically active substances from further degradation in the rumen. In U.S. Pat. No. 4,248,899 to Lyon, et al., a feed supplement is prepared from protein extracted from a leafy green source. The protein is then combined with a triglyceride lipid material. U.S. Pat. Nos. 5,145,695 and 5,219,596 to Smith, et al. disclose a feed formulation of dairy feedstuffs which is balanced to deliver necessary amino acid requirements at a particular point in a cow's digestive system.

Another method involves utilizing the difference in pH between the rumen and the abomasum by coating the feed with a polymer which is insoluble in the environment of the rumen but is soluble in the strongly acidic abomasum. Still another method, disclosed in U.S. Pat. No. 5,227,166 to Ueda, et al., involves coating a core of biologically active substances with lecithin, at least one inorganic substance which is stable at a neutral pH and soluble under acidic conditions, and at least one substance selected from the group consisting of straight-chain or branched-chain saturated or unsaturated monocarboxylic acids and salts having 14 to 22 carbon atoms, hardened vegetable oils, hardened animal oils and waxes.

While effective to one degree or another, these methods generally require extensive processing and/or expensive reagents. As such, simplified and/or more economical methods for supplying sufficient quantities of essential amino acids for absorption in the small intestines remain of interest to the ruminant feed industry.

SUMMARY OF THE INVENTION

According to this invention, a hard, stable, extruded animal feed nugget is prepared for ruminants, the nugget comprising between about 90 to 99 wt % of at least one protein-containing ingredient and between about 1.0 to 6.0 wt % of added fat. Preferably, the animal feed nugget is also comprised of between about 0.02 and 5.0 wt % of sulfur. The animal feed nugget of this invention is prepared by a method comprising the steps of:

A. plasticizing a blend comprising at least one protein-containing ingredient, added fat and sulfur, if present, and water at an elevated temperature and pressure, B. forming an animal feed nugget by extruding the plasticized blend of (A) above through a restricted orifice into an environment of lower temperature and pressure than that used to plasticize the blend in (A) above, and C. drying the extruded nugget to a water content of less than about 12 wt %, based on the total weight of the nugget.

Animal feed nuggets prepared by this method function as a rumen escape composition, and they permit the release of beneficial nutrients in the abomasum or subsequent digestive tract. Thus, when this nugget is fed as part of a lower crude protein diet, the ruminants can actually achieve the same level of milk and milk component yield as those ruminants fed a normal crude protein diet. Ruminants can consume these nuggets without adversely influencing their ability to digest dietary fiber or other nutrient components, and these nuggets improve the palatability of various finished feed products.

DETAILED DESCRIPTION OF THE INVENTION

The animal feed nugget of this invention is a food supplement comprising a relatively homogeneous blend of at least one protein-containing ingredient and added fat. At least about 90 wt %, preferably at least about 93 wt %, and still more preferably at least about 96 wt % of the nugget is comprised of the protein-containing ingredient(s). The maximum amount of the protein-containing ingredient(s) is typically not greater than 99 wt %. Protein sources include oil seed meals such as soybean meal and cottonseed meal; animal by-product meals such as meat meal, poultry meal, blood meal, feather meal and fish meal; plant by-product meals such as wheat middlings, soybean hulls and corn by-products; and microbial protein such as torula yeast and brewer's yeast. Soybean meal is the preferred protein source. The soybean meal can be solvent or expeller extracted, full or dehulled soybean meal.

The "added fat" of this invention includes liquid and soluble materials comprising edible mono-, di- and triglycerides of fatty acids and free fatty acids which are not inherently present in any other nonfat sources that may be present, e.g. the indigenous fat present in soybean meal, etc. Added fat includes both animal fat, e.g. beef tallow, bleachable fancy tallow, choice white grease, yellow grease, etc.; vegetable oil, e.g. soybean oil, palm oil, cottonseed oil, sunflower oil, corn oil, canola oil etc.; and combinations of any of these. The amount of added fat in the nugget is typically at least about 1.0 wt %, preferably at least about 3.0 wt %. The maximum amount of added fat in the nugget is typically not greater than about 6.0 wt %.

Preferably, the animal feed nugget of this invention also is comprised of an amount of sulfur which does not adversely effect the economic or nutritional aspects of the dietary supplement. Typically, the nugget contains at least about 0.02 wt % sulfur, preferably at least about 0.2 wt % sulfur. The maximum amount of sulfur is typically not greater than about 5.0 wt %. Any source of elemental sulfur can be used, however, sulfur flour and flowers of sulfur are the preferred sources. Without being bound by theory, it is believed that the sulfur acts as a crosslinking agent between certain amino acids in the protein and this in turn may be responsible for the enhancement of the rumen escape of the protein and their constituent amino acids in the extruded animal feed nugget of this invention.

Ingredients other than the protein-containing ingredient (s), added fat and sulfur also may be present in the animal feed nugget. These include flavorings such as molasses, coloring and dye ingredients, vitamins and minerals, various processing aids, such as calcium chloride, and any other normal feed ingredients, such as corn, alfalfa, wheat, etc. These other ingredients are present, if present at all, in minor amounts relative to the combined amount of protein, added fat and sulfur. They are used in known ways for conventional purposes.

The animal feed nugget of this invention typically has a pH of not greater than 8.0, preferably a pH of not greater than 6.6, still more preferably a pH of about 5.5. The minimum pH of the animal feed nugget is typically not less than 3.0.

The added fat of this animal feed nugget is within or an integral part of the nugget, as opposed to a coating upon the nugget. The added fat is admixed with the protein-containing ingredient(s), sulfur and other ingredients, if any, prior to or within the extruder to form a relatively homogeneous blend, subjected to extruder cooking conditions (plasticized), and then extruded and cut into nuggets. Some fat will form part of the nugget surface but only in the same context that the protein, sulfur and other ingredients, if any, will form part of the nugget surface, i.e. as a component of a relatively homogeneous mass. While more fat can be added to the nugget in the form of a coating subsequent to the formation of the nugget, this is not required for the practice of this invention.

The nuggets are formed through the use of conventional extrusion devices, such as that described in U.S. Pat. No. 3,496,858 which is incorporated herein in its entirety by reference. Typically, the protein-containing ingredient(s), sulfur and other dry, nonfat ingredients, if any, are first blended in a dry mixer (e.g., Hobart mixer or ribbon mixer) to form a relatively homogeneous mixture and then ground by any suitable means (e.g., Hammermill grinder). This ground mixture is fed to the extruder, typically through the conditioner. The extruder usually operates at a temperature of at least about 100 C., and this temperature in combination with the pressure caused by the action of the rotating screw on the mixture and the friction between the flowing mixture and the component parts of the extruder result in a pressure within the extruder typically in excess of 20 psig, preferably in excess of 30 psig. The mixture is mechanically worked by the rotating screw until it eventually flows in a generally fluid manner.

Fat is added to the extruder, typically at the conditioner, and once the mixture of fat and nonfat ingredients is a relatively homogeneous, free-flowing mass, it is fed into the extruder barrel. The action of the rotating screw and extruder conditions (e.g. temperature and pressure) maintain the mass in a homogeneous, free-flowing state.

Steam is also added to the extruder to increase the temperature of the material, typically to or in excess of about 100 C., and/or to raise the moisture content of the mixture. The steam is typically added at the conditioner of the extruder; however, it also may be added at the barrel. The amount of heat and steam applied to the mixture is controlled by known valving techniques in a manner to obtain temperatures which are sufficiently high to cause the desired chemical and physical reactions within the mixture. The amount of heat and steam actually added to a given mixture of added fat and nonfat ingredients will vary with the nature and ratio of components and the other operating parameters of the extruder, e.g. pressure, residence time of the mixture, etc.

After the mixture has been sufficiently blended and cooked, it is forced from the extruder by the rotating screw or screws through a restricted orifice. Since the mixture emerges from an environment of high temperature and pressure into an environment of lower temperature and pressure (typically ambient or room temperature and pressure), the mixture expands upon leaving the extruder. This results in a cooling of the mixture and a partial loss of its water content (in the form of steam). The mixture leaves the extruder in an extended ribbon which is cut by any conventional cutting means into nuggets typically having a diameter of approximately ¼ inch. A typical extruded product as it leaves the extruder has a bulk density between about 30 and about 40 lbs per bushel.

The extrudate of this invention is not very sticky or difficult to dry. It, however, is important to reduce the moisture content of the extrudate to less than about 12 wt % to obtain a stable, hard-finished product. As such, the extrudate is dried by any conventional means to achieve such a moisture reduction (e.g. forced air dryer).

The ingredient recipe may vary with the design of the extruder and its operating conditions. The water content of both the finished nugget and the homogeneous blend in the extruder before, during and subsequent to its cooking can also vary.

The finished nugget is used as a food supplement, typically as a component of a finished feed product designed for ruminants. Preferably, the finished feed nugget is subjected to size reduction prior to its incorporation into the finished feed product. Without being bound by theory, it is believed that overpolymerization of certain amino acids in the protein may occur during the extrusion process, thereby causing difficulty with post ruminal absorption. Size reduction of the nugget appears to consistently provide better digestibility of the feed product and better escape of the beneficial nutrients. Thus, any conventional means can be used to reduce the size of the feed nugget, e.g. Hammermill grinder. Typically, the ground feed nugget has a diameter of less than about ¹⁄₁₆ inch.

The nugget (either whole or ground form) can be used alone or in combination with a pre-mixed ration as a feed supplement for dairy cattle. Typically the whole or ground form of the nugget is blended with a pre-mixed ration that itself is in a meal, nugget or pellet form and consists of such ingredients as starch, plant and animal protein sources, vitamin and mineral additives, nitrogen sources, and the like. This feed supplement is fed to the dairy cattle along with fibrous foodstuffs, such as alfalfa and corn silage, and of course, water. The overall mix of ingredients in the animal's diet are selected to maximize the desired health and milk production of the animal.

The following examples are illustrative of certain specific embodiments of this invention. Unless indicated to the contrary, all parts and percentages are by weight.

SPECIFIC EMBODIMENTS

EXAMPLE 1

Influence of Fat and Sulfur Levels on Site of Extruded SBM Digestion for Animal Nugget Samples Prepared Using a Wenger X-20 Extruder Briefly, all but one of the samples of animal feed nuggets of this invention, were prepared using a Wenger X-20 cooking extruder. The Wenger X-20 is a laboratory scale extruder with a 30 horsepower motor, and it has the capacity to produce up to 400 lbs/hr of animal feed. The animal feed nugget samples were then evaluated in sacco and in vitro using a fistulated Holstein cow in order to determine the digestibility of the samples.

Sample Preparation

Eight 150 pound animal feed samples (C1–C4 and A–D) were prepared consistent with the proportions appearing in Table 1:

TABLE 1

Composition of Animal Feed Samples

| Sample/ Component | C1 | C2 | C3 | C4 | A | B | C | D |
|---|---|---|---|---|---|---|---|---|
| SBM (%) | 100 | 100 | 99.5 | 99.0 | 97.0 | 94.0 | 96.5 | 96.0 |
| Fat (%) | 0 | 0 | 0 | 0 | 3 | 6 | 3 | 3 |
| Sulfur (%) | 0 | 0 | 0.5 | 1.0 | 0 | 0 | 0.5 | 1.0 |

Sample C1 was a control comprising untreated (i.e. unextruded) soybean meal (SBM). Samples C2–C4 were controls comprising only extruded SBM and sulfur (no fat was added). Samples A–D represent the extruded animal feed nuggets of this invention. Samples C and D are preferred embodiments of this invention (i.e. they contain SBM, fat and sulfur).

Extruded animal feed nugget samples (C2–C4 and A–D) were prepared using a Wenger X-20 Extruder. Specifically, the protein-containing ingredient (purchased SBM which was ground through a No. 4 Hammermill screen), sulfur (sulfur flour) and added fat (beef tallow) were placed in the proportions as set forth in Table 1 in a Hobart mixer and blended until a homogenous mixture for each sample was obtained. Each mixture was then fed to the 30 horsepower Wenger X-20 cooking extruder equipped with a 0.187 inch die (1 hole). The extruder was run according to the conditions as set forth in Table 2:

TABLE 2

Extrusion Conditions Using a Wenger X-20 Cooking Extruder

| Sample/Conditions | C2 | C3 | C4 | A | B | C | D |
|---|---|---|---|---|---|---|---|
| Water, conditioner (lbs/min) | .26 | .24 | .24 | .25 | .25 | .25 | .25 |
| Water, barrel (lbs/min) | .96 | 1.0 | .99 | .97 | .97 | .99 | .98 |
| Conditioned meal temperature (F.) | 199 | 198 | 198 | 201 | 195 | 202 | 203 |
| Motor amps | 28 | 26 | 26 | 24 | 20 | 24 | 24 |
| Production rate dry meal (lbs/min) | 5 | 5 | 5 | 5 | 5 | 5 | 5 |

Each mixture was mechanically worked within the extruder at a temperature in excess of 100 C. with the pressures varying generally above 20 psig. Each homogenous mixture then was continuously passed through the extruder and finally through the extruder die. Each mixture was extruded through the die in a continuous stream, and was a coherent structure which expanded with passage through the die to form a striated structure. The products were sliced into nuggets with a diameter of approximately ¼ inch as they exited the die. The nuggets of each sample were then transferred by conveyor belt to a forced air dryer and dried at a temperature of about 220–230 F.

The nuggets of each sample entered the dryer with a water content of about 30 wt % and after approximately 15 minutes in the dryer at the above-stated conditions, left the dryer with a water content of about 9 wt %. The finished nuggets of each sample exhibited a hard surface with good particle integrity.

In Sacco and In Vitro Evaluations

One ruminally fistulated Holstein cow was housed and fed forage as a mixture of corn silage (25%), alfalfa hay (25%) and milking ration (50%) on a dry matter basis offered ad lib for at least a two week period prior to use.

The extruded animal feed nugget samples (C1–C4 and A–D) to be evaluated in sacco and in vitro were ground in a Wiley Mill through a 4 mm screen. The untreated sample of SBM (C1) remained unground.

Each sample (including the unground, untreated sample of SBM) was divided into six bags (Tetko P-CAP™ polyester bags; approximate pore size of 52 µm). Two of the six bags were used as 0 hr. controls (i.e. these bags were not exposed to the rumen of the fistulated cow). The other four bags were inserted into the rumen of the fistulated cow for 24 hours (in sacco).

After a 24 hour exposure in the rumen of the fistulated cow, the four bags were removed and rinsed in cold water in order to stop the microbial action. Two of the 24 hr. in sacco bags were refrigerated for later washing. The remaining two 24 hr. in sacco bags were further incubated in 0.1N HCl solution containing an amount of pepsin equivalent to the sample weight in enough fluid volume to cover the sample adequately (in vitro). The bags were agitated in a 39 C. environment for 1 hour and then immediately removed and washed along with the 0 hr. control bags and the 24 hr. in sacco bags, in cold water in a washing machine under constant agitation.

All of the sample bags (i.e. the 0 hr. control bags, the 24 hr. in sacco bags and the in vitro bags) were then dried in a 55 C. oven for 2 days. The bags were weighed and dry matter disappearance (DM) calculated. The dry matter or nitrogen escape was calculated using the following formula:

$$[1-(\text{in sacco value/in vitro value})] \times 100$$

The results from the 24 hr. in sacco experiments provide an estimate of ruminal digestion of the SBM samples. The results from the in vitro experiments provide an estimate of the total digestion of the SBM samples. While true absolute measures of digestion in vivo may differ from the in sacco and in vitro results, relative comparisons of these estimates among treatments allow for optimizing animal feed nugget composition parameters.

The results of the in sacco and in vitro tests are reported in percentage dry matter disappearance, and appear in Table 3:

TABLE 3

Dry Matter Disappearance (%)

| Sample/ Treatment | C1 | C2 | C3 | C4 | A | B | C | D |
|---|---|---|---|---|---|---|---|---|
| 0 hr | 29.9 | 35.5 | 27.5 | 27.5 | 34.7 | 37.2 | 33.8 | 33.7 |
| In sacco 24 hr | 98.5 | 84.5 | 72.0 | 75.8 | 72.7 | 88.3 | 70.2 | 68.9 |
| In vitro (acid/pepsin) 1 hr | 99.2 | 96.8 | 92.7 | 95.5 | 96.9 | 97.8 | 95.1 | 93.0 |
| Escape (%) | 0.7 | 12.7 | 22.3 | 20.6 | 25.0 | 9.7 | 26.2 | 25.9 |

These results indicate that ruminal dry matter escape was maximized when SBM was extruded in the presence of 3.0% fat and 0.5 to 1.0% sulfur (samples C and D). Under these extrusion conditions (i.e. using a Wenger X-20), the ruminal escape tended to be more influenced by fat than sulfur levels.

The animal feed residues of these samples were further evaluated using Nitrogen analysis to determine the percentage of protein disappearance. Nitrogen analysis involves the reduction of nitrogenous compounds in a sample. Specifically, the nitrogenous compounds are reduced, in the presence of boiling sulfuric acid, catalyzed by a potassium sulfate/titanium dioxide/cupric sulfate mixture, to form ammonium sulfate. The resultant solution is cooled, diluted, and made alkaline with a sodium hydroxide-thiosulfate solution. Ammonia is liberated and distilled into a known amount of standard acid. The distillate is titrated, and nitrogen or protein is calculated from the known amount of reacting acid.

The protein disappearance (i.e. escape) is calculated using the same formula as the dry matter disappearance; namely, the in sacco value is divided by the in vitro value, subtracted from 1 and multiplied by 100.

The results of this test are reported in percentage of protein disappearance and appear in Table 4:

TABLE 4

| | Protein Disappearance (%) | | | | | | | |
|---|---|---|---|---|---|---|---|---|
| Sample/Treatment | C1 | C2 | C3 | C4 | A | B | C | D |
| 0 hr | 18.8 | 19.1 | 12.5 | 12.2 | 13.1 | 17.7 | 16.7 | 15.4 |
| In sacco 24 hr | 97.8 | 74.4 | 57.7 | 64.1 | 57.3 | 79.0 | 52.0 | 50.2 |
| In vitro (acid/pepsin) 1 hr | 98.7 | 95.5 | 90.5 | 95.4 | 95.4 | 96.6 | 90.7 | 88.6 |
| Escape (%) | 0.9 | 22.1 | 36.2 | 32.8 | 39.9 | 18.2 | 42.7 | 43.3 |

These results indicate that the ruminal protein escape was maximized when SBM was extruded in the presence of 3.0% fat and 0.5 to 1.0% sulfur (samples C and D).

EXAMPLE 2

Influence of Fat and Sulfur Levels on Site of Extruded SBM Digestion for Animal Nugget Samples Prepared Using an Anderson Extruder Briefly, all but one of the samples of animal feed nuggets, were prepared using an Anderson Cooking Extruder. The Anderson Cooking Extruder is a production scale extruder with a 150 horsepower motor and the capacity to produce 3500 lbs/hr of animal feed. The animal feed nugget samples were then evaluated in sacco and in vitro using a fistulated Holstein cow in order to determine the digestibility of the samples.

Sample Preparation

Seven 2,000 pound animal feed samples (C5–C7 and E–H) were prepared consistent with the proportions of Table 5 below:

TABLE 5

| | Composition of Animal Feed Samples | | | | | | |
|---|---|---|---|---|---|---|---|
| Sample/Component | C5 | C6 | C7 | E | F | G | H |
| SBM (%) | 100 | 100 | 99.98 | 97 | 94 | 93.98 | 96.98 |
| Fat (%) | 0 | 0 | 0 | 3 | 6 | 6 | 3 |
| Sulfur (%) | 0 | 0 | 0.02 | 0 | 0 | 0.02 | 0.02 |

Sample C5 is a control comprising untreated (i.e. unextruded) SBM. Samples C6 and C7 are controls comprising only extruded SBM or extruded SBM and sulfur. Samples E–H represent the extruded animal feed nuggets of this invention. Sample H is the preferred embodiment of this invention.

The extruded animal feed nugget samples (C6–C7 and E–H) were prepared using an Anderson Cooking Extruder. Specifically, the SBM is ground through a No. 4 Hammermill screen and an ACM air classifying grinder with the separator operating at 300 rpm. The ground SBM and sulfur (sulfur flour) were placed in proportions consistent with Table 5 in a dry mixer (i.e. 5 ton ribbon mixer) and blended until a homogenous mixture for each sample was obtained. Each mixture along with the added fat (beef tallow) was fed to a 150 horsepower, 8" Anderson Cooking Extruder equipped with a 0.16 inch die (17 holes). The extruder was run at the conditions detailed in Table 6:

TABLE 6

| Extrusion Conditions Using an Anderson Cooking Extruder | | | | | | |
|---|---|---|---|---|---|---|
| Sample/Conditions | C6 | C7 | E | F | G | H |
| Number of knife blades | 8 | 8 | 8 | 8 | 8 | 8 |
| Extruder amps | 155 | 160 | 128 | 109 | 109 | 144 |
| Conditioned meal temperature (F.) | 222 | 226 | 220 | 220 | 222 | 227 |
| Water, conditioner (g/min) | 2.2 | 2.2 | 2.8 | 2.9 | 2.2 | 1.8 |
| Production rate dry meal (lbs/min) | 45 | 45 | 55 | 55 | 55 | 55 |

Each mixture was mechanically worked within the extruder at a temperature in excess of 100 C. with the pressures varying generally above 20 psig. Each homogenous mixture was continuously passed through the extruder and finally through the extruder die. Each mixture was extruded through the die in a continuous stream and was a coherent structure which expanded with passage through the die to form a striated structure. The products were sliced into nuggets with a diameter of approximately ¼ inch as they exited the die. The nuggets of each sample were then transferred by conveyor belt to a fluid bed dryer and dried at a temperature of 380 to 400 F.

The nuggets entered the dryer with a water content of about 30 wt % and after approximately 2.0 minutes in the dryer at the above-stated conditions, left the dryer with a water content of about 9.0 wt %. The finished nuggets exhibited a hard surface with good particle integrity.

In Sacco and In Vitro Evaluations

The unextruded and extruded Samples (C5–C7 and E–H) were evaluated in sacco and in vitro as described in Example 1. The results of these tests are reported in percentage of dry matter disappearance and appear in Table 7:

TABLE 7

| | Dry Matter Disappearance (%) | | | | | | |
|---|---|---|---|---|---|---|---|
| Sample/Treatment | C5 | C6 | C7 | E | F | G | H |
| 0 hr | 27.3 | 31.1 | 32.4 | 34.6 | 38.8 | 36.8 | 36.4 |
| In sacco 24 hr | 97.0 | 84.0 | 79.0 | 91.6 | 91.0 | 84.0 | 74.8 |
| In vitro (acid/pepsin) 1 hr | 97.5 | 96.0 | 98.6 | 97.5 | 98.2 | 99.5 | 99.3 |
| Escape (%) | 0.5 | 12.5 | 19.9 | 6.0 | 7.3 | 15.6 | 24.7 |

These results indicate that ruminal DM escape was maximized when SBM was extruded in the presence of 3.0% fat and 0.02% sulfur (Sample H). Under these extrusion conditions (i.e. an Anderson Cooking Extruder), the ruminal escape was influenced by both fat and sulfur levels.

EXAMPLE 3

Influence of Extrusion on Ruminal Escape of Crude Protein, Lysine and Methionine when Evaluated In sacco One 5 ton sample of hard, stable animal feed nuggets was prepared comprising 96.8% SBM, 3.0% fat (beef tallow) and 0.2% sulfur (sulfur flour). The sample was extruded using the Anderson cooking extruder as described in Example 2. A control sample also was prepared comprising untreated (i.e. unextruded) SBM.

These two samples were evaluated in sacco as described in Example 1. These in sacco samples were further analyzed for quantities of residual crude protein, residual lysine and residual methionine using an Amino Acid Analyzer.

In the amino acid analysis, a portion of sample was mixed with hydrochloric acid solution in a modified Kjeldahl flask. To prevent oxidation of the amino acids, as much oxygen as possible was removed from the flask by repeated heating and freezing, under vacuum. The neck of the flask was heat sealed, and the flask heated in a 110 C. oven for 20 hours. Protein in the sample was hydrolyzed to amino acids by the hot hydrochloric acid solution. The samples were cooled, opened, mixed with internal standard and adjusted to pH 2.2.

The amino acids then were separated on an ion exchange column, in an amino acid analyzer, by a pH gradient elution with controlled column temperatures. The separated amino acids were subsequently reacted with ninhydrin, forming color complex solutions that are measured spectrophotometrically. The concentration of each amino acid was quantified against a standard solution of amino acids of known concentration, and internal standard, which was injected into the amino acid analyzer. (Using a 250 mg sample, the lowest confidence level of this method, for each amino acid, is 0.05 g/100 g sample.) The Residue (% of Initial DM) indicated the amount of either crude protein, lysine or methionine that was delivered to the abomasum. These values were calculated using the following formula:

[1−(% DMD/100)]×[Residue (% of Residual DM)/100]

The results of this test are reported in Table 8:

TABLE 8

Amount Crude Protein, Lysine and Methionine Remaining After SBM Digestion In Sacco

| | DMD | Residue, (% of Residual DM) | | | Residue, (% of Initial DM) | | |
|---|---|---|---|---|---|---|---|
| | (%) | CP | lys | met | CP | lys | met |
| Untreated SBM | | | | | | | |
| Undig. | 0 | 53.5 | 3.47 | 0.75 | 53.5 | 3.47 | 0.72 |
| 0 hr | 28.9 | 66.5 | 4.32 | 0.92 | 47.3 | 3.07 | 0.65 |
| In sacco 24 hr | 97.5 | 83.1 | 5.17 | 1.23 | 2.1 | .13 | 0.03 |
| Extruded SBM | | | | | | | |
| Undig. | 0 | 53.5 | 3.47 | 0.72 | 53.5 | 3.47 | 0.72 |
| 0 hr | 32.1 | 72.4 | 4.49 | 0.97 | 49.2 | 3.05 | 0.66 |
| In sacco 24 hr | 62.5 | 83.1 | 5.17 | 1.23 | 31.2 | 1.94 | 0.46 |

These results compare the quantities of residual crude protein (CP), residual lysine (lys) and residual methionine (met) remaining after the digestion of untreated SBM and extruded SBM in sacco. Specifically, the extruded SBM of this invention showed 14.9 times more crude protein, 14.9 times more lysine and 15.3 time more methionine remaining than for untreated SBM. This demonstrates the ability of the extruded SBM of this invention to deliver more protein and amino acids post-ruminally compared to untreated SBM.

EXAMPLE 4

Influence of Crude Protein Level and SBM Extrusion on Site of Nitrogen Digestion in Steers Four intestinally fistulated steers were housed and fed a specific diet (Diets C8, C9, I or J) comprising a mixture of corn silage (30%), alfalfa hay (20%) and a Ration mix (50%) on a dry matter basis offered ad lib for an adjustment period of at least two weeks. Two of the steers were fed a diet containing an untreated (i.e. unextruded) soybean meal (Diets C8 and C9). One of these diets was formulated to contain a dietary crude protein level of 16% (Diet C8); the other was formulated to contain a dietary crude protein level of 18.5% (Diet C9). The other two steers were fed a diet containing ground, extruded animal feed nuggets comprising 96.8% soybean meal, 3.0% added fat (beef tallow) and 0.2% sulfur (Diets I and J). One of these diets was formulated to contain a dietary crude protein level of 16% (Diet I); the other was formulated to contain a dietary crude protein level of 18.5% (Diet J).

After completion of the adjustment period, five different types of samples were collected from the steers for a 5 day period. These samples included: rumen sampling, bacteria harvesting, duodenal sampling, ileal sampling and fecal sampling. From these samples, tests were run and calculations were made to determine the dry matter intake, nitrogen intake, nitrogen in the duodenum and the nitrogen digestion in the small intestine.

The results of these tests are reported in Table 9:

TABLE 9

Influence of Crude Protein Level and SBM Extrusion on Site of Nitrogen Digestion in Steers

| Diet | C8 | C9 | I | J |
|---|---|---|---|---|
| Dietary Protein (%) and SBM type in Diet | 16 and unextruded | 18.5 and unextruded | 16 and extruded | 18.5 and extruded |
| Resulting Crude Protein (%) | 19 | 21 | 19 | 20 |
| Dry Matter Intake (kg/day) | 9.22 | 9.50 | 8.84 | 9.39 |
| Nitrogen Intake (g/day) | 282[a] | 319[c] | 268[a] | 299[b] |
| Nitrogen in Duodenum (g/day) | 222[a] | 235[ab] | 232[a] | 268[b] |
| Nitrogen Digestion in Small Intestine (% of duodenal entry) | 56.0 | 58.7 | 60.8 | 59.2 | a, b, c means in the same row not followed by a common letter differ (P < .05) using LSD procedure.

These results demonstrate that the extruded SBM delivers more protein nitrogen to the small intestine in a digestible form. Specifically, the nitrogen intake was greater with the two higher percent crude protein diets. In addition, the 19% crude protein diet containing extruded SBM (Diet I) supplied the same amount of total nitrogen to the duodenum compared to the 21% crude protein diet containing regular SBM (Diet C9). Moreover, the 20% crude protein diet containing extruded SBM (Diet J) supplied greater total nitrogen to the duodenum as the 21% crude protein diet containing regular SBM (Diet C9). Finally, the digestibility of nitrogen in the small intestine was similar for diets containing either regular SBM or extruded SBM, demonstrating that extrusion does not decrease or increase digestibility of protein in the small intestine.

It also is interesting to note that the resulting dietary crude protein levels were higher than formulated. This increase in crude protein levels was due to an unexpectedly high crude protein level in the alfalfa hay portion of the diet.

EXAMPLE 5

Influence of pH on Site of Extruded SBM Digestion When Evaluated In Sacco and In Vitro Five 150 pound samples of hard, stable animal feed nuggets (K–O) were prepared consistent with the proportions in Table 10:

TABLE 10

Composition of Animal Feed Samples

| Sample/Component | K | L | M | N | O |
|---|---|---|---|---|---|
| SBM (%) | 96.8 | 96.8 | 96.8 | 96.8 | 96.8 |
| Fat (%) | 3.0 | 3.0 | 3.0 | 3.0 | 3.0 |
| Sulfur (%) | 0.2 | 0.2 | 0.2 | 0.2 | 0.2 |
| pH | 6.6 | 6.0 | 5.5 | 7.0 | 7.5 |

Phosphoric acid (75%) and/or sodium hydroxide (50%) was added in an amount sufficient to alter the pH of the various samples.

These animal feed nugget samples were extruded using the Wenger Cooking Extruder as described in Example 1. These samples were then evaluated in sacco and in vitro by the process also described in Example 1.

The results of these tests are reported in percentage of dry matter disappearance in Table 11:

TABLE 11

Dry Matter Disappearance (%)

| Sample/Treatment | K | L | M | N | O |
|---|---|---|---|---|---|
| pH | 6.6 | 6.0 | 5.5 | 7.0 | 7.5 |
| 0 hr | 30.5 | 31.8 | 32.7 | 30.8 | 31.1 |
| In sacco 24 hr | 66.2 | 64.6 | 63.6 | 69.2 | 75.6 |
| In vitro (acid/pepsin) 1 hr | 97.4 | 97.5 | 96.8 | 97.6 | 97.6 |
| Escape (%) | 32.0 | 33.7 | 34.3 | 29.1 | 22.5 |

These results indicate that increasing (i.e. more basic) meal pH decreased the percentage of ruminal dry matter escape when SBM was extruded in the presence of 0.2% sulfur and 3.0% fat. However, extruded SBM receiving no pH modification (i.e., Sample K) showed a similar percentage of ruminal dry matter escape as the lower pH modified extruded SBM (i.e. Samples L and M).

EXAMPLE 6

Influence of Abomasal Casein or Isolated Soy Protein Infusions on Milk Yield and Composition and Nitrogen Balance in Cows Fed Protein Limiting Diets Twelve lactating Holstein cows (4 with ruminal cannulas, 4 with abomasal catheters and 4 "intact", i.e. without cannulas or catheters) were group-housed and group-fed forage as a mixture of corn silage (25%), alfalfa hay (25%) and a concentrate mix (50%) on a dry matter basis offered ad lib for a two week period. The four intact cows were in a similar stage of lactation as the other eight cows.

At the end of the two week period, the 12 cows were divided into three groups. The four intact cows comprised one control group. The other groups were comprised of two abomasally and two ruminally cannulated cows each.

The three groups of cows then were fed a mixture comprising an adequate protein ration (50%), corn silage (25%) and alfalfa hay (25%) on a dry matter basis offered at an ad lib intake level for a two week period. The mixture was a soy hull and corn based milking ration which, when mixed with corn silage and alfalfa hay, provided on a DM basis: 18% Crude Protein (CP), 19.5% Crude Fiber (CF), 1.2% Calcium, 0.44% Phosphorous and 73% Total Digestible Nutrients (TDN).

At the end of the two week period, the cows then were fed for a three week period a mixture comprising an inadequate protein ration (50%), corn silage (25%) and alfalfa hay (25%) on a dry matter basis offered at an ad lib intake level. The mixture was a soy hull and corn based milking ration which, when mixed with corn silage and alfalfa hay, provided on a DM basis: 12.4% Crude Protein (CP), 22% Crude Fiber (CF), 1.2% Calcium, 0.44% Phosphorous and 73% Total Digestible Nutrients (TDN). During this three week period, one of the groups of cannulated cows received an abomasal casein infusion (1100 g/day), while the other group of cannulated cows received an abomasal isolated soy protein infusion (1100 g/day) which was fortified with an amount of lysine and methionine to be equivalent to the casein infusion. The control group which consisted of intact cows only, received no protein infusion during this period. At the end of the three week period, the cows again were fed the mixture containing the adequate protein ration for a final two week period.

A positive displacement pump delivered the protein infusions to the two groups of cannulated cows. The infusions were delivered at a rate of 1100 g/22 hours. Milk samples were collected the last 5 days of each infusion period. Dry matter intake was fixed at prevailing levels 3 days prior to and during the collection period. Milk/day lb, protein (%) and protein (lb/day) were measured.

The results of these tests are reported in Table 12:

TABLE 12

Influence of Casein or Isolated Soy Protein on Milk and Milk Protein Yield In Cows Fed A Low Protein Diet

| Period Infusion | Pre-Infusion | No Infusion | Casein Infusion | Isolated Soy Protein Infusion | Standard Error |
|---|---|---|---|---|---|
| Milk/Day (lb) | 84.45$^b$ | 77.20$^a$ | 80.82$^{ab}$ | 80.10$^{ab}$ | 2.02 |
| Protein (%) | 2.950$^a$ | 2.987$^a$ | 3.197$^c$ | 3.115$^b$ | 0.013 |
| Protein (lb/day) | 2.478$^b$ | 2.283$^a$ | 2.595$^b$ | 2.494$^b$ | 0.057 | a, b, c means in the same row not followed by a common letter differ (P < 0.05) using the LSD procedure.

These results indicate that the cows fed with a lower crude protein diet, but infused with isolated soy protein were capable of producing milk and milk protein at levels similar to those achieved on an adequate protein diet. In comparison, the cows fed with a lower crude protein diet which received no infusion produced milk and milk protein at lower levels than those achieved with an adequate protein diet.

Although the invention has been described in considerable detail through the preceding specific embodiments, this detail is for purposes of illustration. Many variations and modification can be made by one skilled in the art without departing from the spirit and scope of the invention.

What is claimed is:

1. A process for preparing a hard, stable, extruded animal feed nugget for ruminants, the process comprising the steps of:

A. Plasticizing a blend comprising between about 90 wt % and about 99 wt % of at least one protein-containing ingredient and between about 1.0 wt % and about 6.0 wt % of at least one added fat other than fish oil at an elevated temperature and pressure, and B. Forming an animal feed nugget by extruding the blend of (A) through a restricted orifice into an environment of lower temperature and pressure than that used to plasticize the blend in (A), and C. Drying the extruded nugget to a water content of less than about 12 wt %.

2. The process of claim 1 in which the blend of (A) contains between about 0.02 wt % and 5 wt % sulfur.

3. The process of claim 1 in which the protein-containing ingredient is selected from the group consisting of soybean meal, cottonseed meal, corn gluten meal, peanut meal, an animal by-product meal, a plant by-product meal and a microbial protein meal.

4. The process of claim 3 in which the protein-containing ingredient is soybean meal.

5. The process of claim 1 in which the added fat is at least one fat selected from the group consisting of beef tallow, bleachable fancy tallow, choice white grease, yellow grease, soybean oil, palm oil, cottonseed oil, sunflower oil, corn oil and canola oil.

6. The process of claim 5 in which the added fat is beef tallow.

* * * * *